(No Model.)

C. F. PIKE.
TRAP FOR WASH STANDS, &c.

No. 270,111. Patented Jan. 2, 1883.

Witnesses
H. Hoonaugh
W. H. Van Hoof

Inventor
Charles F. Pike
By S. J. Vanstavoren
Attorney.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

TRAP FOR WASH-STANDS, &c.

SPECIFICATION forming part of Letters Patent No. 270,111, dated January 2, 1883.

Application filed July 31, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Wash-Stands, &c., of which the following is a specification, reference being had therein to the accompanying drawings, wherein—

Figures 1, 4:
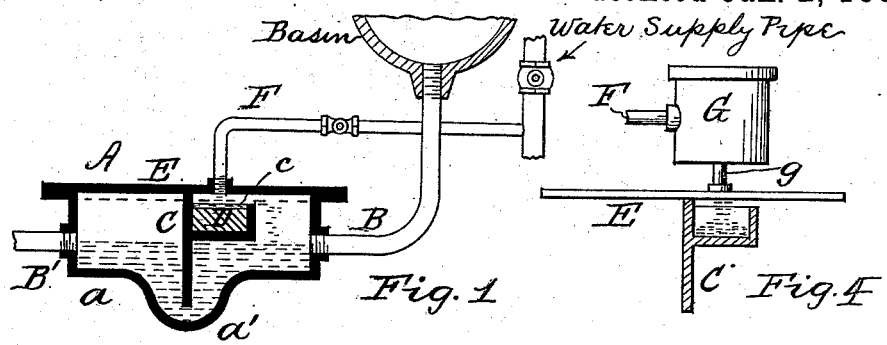
Figure 2:
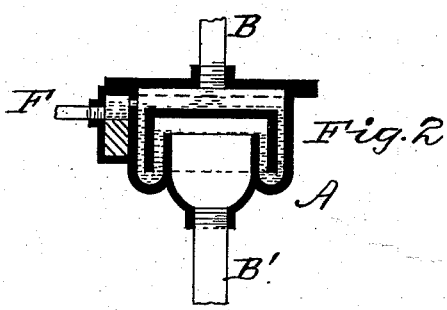
Figure 3:
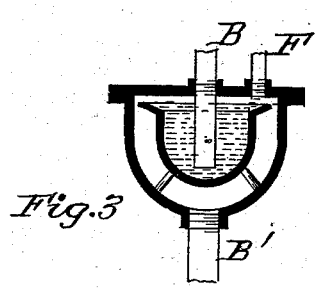
Figure 5:
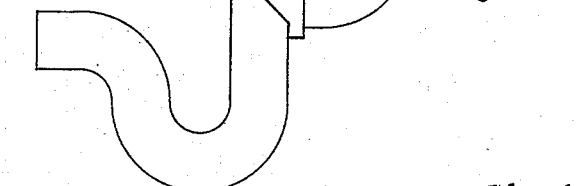
Figure 6:
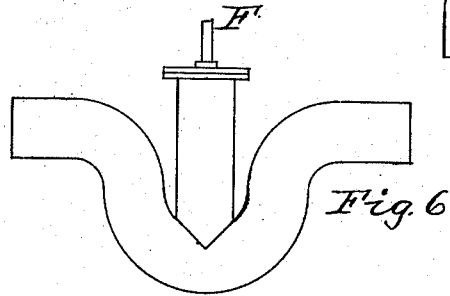
Figure 7:
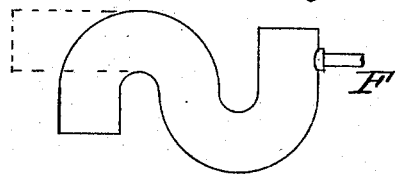
Figure 8:
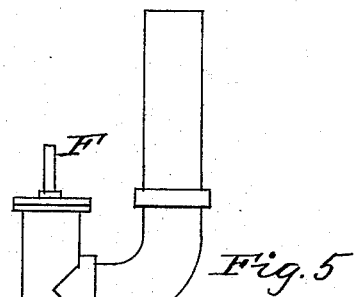

Figure 1 is a longitudinal vertical section of a trap for wash-basins, bath-tubs, lavatories, &c., embodying my invention. Figs. 2 and 3 are similar views of modifications of same. Fig. 4 is a broken elevation of a detail modification, and Figs. 5, 6, 7, and 8 show my invention applied to soil-pipes and traps.

My invention has relation to traps for wash-basins, bath-tubs, lavatories, soil-pipes, and their traps, and has for its object to provide a running-water seal therefor, and means for regulating the volume or flow of water for such seal.

My invention accordingly consists of a trap provided with a pipe, which connects with a constant source of water-supply, and means for regulating the volume of the flow of water to the trap.

My invention further consists in the novel combination, construction, and arrangement of parts, as hereinafter described and claimed.

Referring to the accompanying drawings, A represents a trap suitable for wash-stands, &c., consisting of an elongated body, $a$, with trough or depression $a'$, having induction and eduction openings B B', respectively, and a central partition, C, having a pocket or recess, $c$, in which is placed a cake of disinfectant, D; or the latter may be in a fluid or powdered condition.

E represents the lid or cap for the trap, and is connected thereto by means of screws, clamps, or other suitable fastening devices. (Not shown in the drawings, as they are well known in connection with traps now in use, and need not therefore be more particularly described.)

F represents a pipe, one end of which is designed to connect with the supply-pipe of the wash-stand, &c., and its other end passes through an opening in the lid or cap E in line with pocket $c$, as shown.

The pipe F may have a bore of a very limited extent or diameter, to permit a minute stream of water to pass therethrough; or the internal diameter of said pipe may be of any size, and the cock in the supply so arranged as to allow a small stream or flow of water to pass thereto. Such constructions and arrangements of said pipe and cock are fully shown and described in an application filed by me on the 5th day of October, 1881, and need not herein be more specifically set forth. The effect of such construction is as follows: The continuous supply of water from pipe F keeps the water in the trap always fresh, or forms therefor a running-water seal, so that sewer-gas entering said trap from the soil-pipe comes in contact with a fresh supply of water, and is absorbed thereby and carried off to the main. As the flow of water is continuous, it never reaches the point of saturation, but is always in condition to quickly take up the gas as soon as it enters the trap. If the disinfectant D is employed, the water from the pipe F first passes into pocket $c$ and absorbs a portion of such disinfectant, whereby a disinfecting-liquid for the sealing of the trap is provided, to more quickly and effectually absorb the said sewer-gas and keep the trap in a fresh and wholesome condition.

In Fig. 2 I have shown a circular trap-body with pocket $c$ and an inner inverted cup, while in Fig. 3 the cup is in the normal position and the pocket $c$ dispensed with. In Fig. 4 I have shown a reservoir, G, for holding the disinfectant, placed exteriorly to the trap at any suitable location, but is connected thereto by means of pipe $g$, as shown. Figs. 5, 6, 7, and 8 show the application of my invention to soil-pipes, S and P traps, and other traps, respectively, the pipe F having connection therewith at any suitable point, as illustrated.

I have described the running seal as being a continuously-flowing one, and such arrangement I deem the preferable one; but it may be arranged to run at intervals of greater or less duration, regulated by the known condition and construction of the sewerage system in the localities wherein such fixtures are placed—that is to say, in places where the sewers are constructed in accordance with the best advanced principles therefor and the generation of sewer-gas is known to be not abundant the seal may run at intervals only or be converted into an intermittent flowing seal, the duration of the cessation of the flow of water being determined by the time required for the water in the trap to reach the point of sewer-gas saturation. Hence before such point is arrived at the flow of water again commences, so as to have a sealing-water of more or less purity in the trap at all times.

It will be noticed that the seal for said described traps is independent of the waste or other water conveyed thereto by their induction-pipes, such waste water coming from the wash-stand or other fixture to which the trap is affixed. Hence if, when such water passes through the trap, the latter should be siphoned, the water from pipe F soon replaces the seal in the trap and bars the escape of gas therefrom, while in traps which depend upon the waste water or that from the supply-pipe of the wash-stand, &c., for the seal, when siphoning takes place the seal in the trap is broken and there is a free and open passage for the sewer-gas from the main to the apartment wherein the wash-stand, &c., are located. Such passage remains open until the wash-stand is again used, or when after the occupants of such apartments detect the presence of such sewer-gas they permit the water to flow from the spigot of the wash-stand, &c., to replace the seal.

What I claim as my invention is—

1. A stench-trap for wash-basins, &c., provided with a pipe connected to the water-supply pipe of such fixtures, whereby a continuous flow of water is conducted into said trap, in combination with means for regulating the volume of such flow, substantially as set forth.

2. A stench-trap for wash-basins, &c., provided with a disinfectant-containing pocket, and a pipe leading thereto and connected with the water-supply pipe of such fixtures, whereby a continuous flow of water is passed to said pocket to provide a running disinfectant-seal for said trap, substantially as set forth.

3. The trap A, having induction-pipe B, eduction-pipe B', partition C, and curved bottom $a'$, in combination with a water-supply pipe, F, substantially as shown and described.

4. The trap A, having induction-pipe B, eduction-pipe B', partition C, curved bottom $a'$, and pocket D, in combination with a water-supply pipe, F, substantially as shown and described.

In testimony whereof I affix my signature in presence of two witnesses.

CHARLES F. PIKE.

Witnesses:
S. J. VAN STAVOREN,
CHAS. F. VAN HORN.